(12) United States Patent
Shin et al.

(10) Patent No.: US 10,381,607 B2
(45) Date of Patent: Aug. 13, 2019

(54) FABRIC-FRIENDLY TYPE SECONDARY BATTERY PACKAGE

(71) Applicant: JENAX INC., Busan (KR)

(72) Inventors: Eun Jung Shin, Gyeonggi-do (KR); Lee Hyun Shin, Busan (KR); Chang Hyeon Kim, Chungcheongnam-do (KR)

(73) Assignee: Jenax Inc., Busan (KR)

( * ) Notice: Subject to any disclaimer, the term of this patent is extended or adjusted under 35 U.S.C. 154(b) by 269 days.

(21) Appl. No.: 15/507,458

(22) PCT Filed: Jul. 22, 2015

(86) PCT No.: PCT/KR2015/007601
§ 371 (c)(1),
(2) Date: Feb. 28, 2017

(87) PCT Pub. No.: WO2016/036003
PCT Pub. Date: Mar. 10, 2016

(65) Prior Publication Data
US 2017/0288180 A1   Oct. 5, 2017

(30) Foreign Application Priority Data
Sep. 1, 2014   (KR) .................. 10-2014-0115707

(51) Int. Cl.
*H01M 6/00*       (2006.01)
*H01M 2/02*       (2006.01)
(Continued)

(52) U.S. Cl.
CPC .......... *H01M 2/0275* (2013.01); *A41D 1/002* (2013.01); *A42B 1/24* (2013.01); *A43B 3/0005* (2013.01);
(Continued)

(58) Field of Classification Search
CPC .... H01M 2/0275; H01M 2/021; H01M 2/026; H01M 2/0267; H01M 2/0284;
(Continued)

(56) References Cited

U.S. PATENT DOCUMENTS

| | | | |
|---|---|---|---|
| 4,696,066 A * | 9/1987 | Ball | A41D 13/0051 2/102 |
| 2004/0144772 A1* | 7/2004 | Qi | D01F 6/76 219/545 |
| 2009/0326417 A1* | 12/2009 | Ales, III | A61F 13/42 600/584 |

FOREIGN PATENT DOCUMENTS

| | | |
|---|---|---|
| JP | 5063895 | 10/2012 |
| KR | 10-2011-0067398 | 6/2011 |

(Continued)

OTHER PUBLICATIONS

International Search Report dated Oct. 22, 2015 for PCT/KR2015/007601.

*Primary Examiner* — Jane J Rhee
(74) *Attorney, Agent, or Firm* — Jones Day

(57) ABSTRACT

The present invention relates to a battery package attached to an external substrate, which includes an electronic circuit and a power terminal electrically connected to the electronic circuit, to supply power to the electronic circuit, or to accumulate energy by collecting power. A battery package, according to an exemplary embodiment, comprises: a battery unit that has one or more secondary battery cells and leads that are connected to the secondary battery cells and exposed; a flexible encapsulation body that accommodates the battery unit therein; exposed electrodes that are exposed on the surface of the flexible encapsulation body and are electrically connected to the leads to electrically connect to (Continued)

the electronic circuit; and a first Velcro part mounted on the surface of the flexible encapsulation body.

24 Claims, 3 Drawing Sheets

(51) Int. Cl.

| | |
|---|---|
| *A41D 1/00* | (2018.01) |
| *A42B 1/24* | (2006.01) |
| *A43B 3/00* | (2006.01) |
| *H01B 1/06* | (2006.01) |
| *H01M 2/08* | (2006.01) |
| *H01M 2/30* | (2006.01) |
| *H01M 2/06* | (2006.01) |
| *H01M 2/10* | (2006.01) |
| *E04H 15/02* | (2006.01) |

(52) U.S. Cl.
CPC ............. *H01B 1/06* (2013.01); *H01M 2/021* (2013.01); *H01M 2/026* (2013.01); *H01M 2/0267* (2013.01); *H01M 2/0287* (2013.01); *H01M 2/06* (2013.01); *H01M 2/08* (2013.01); *H01M 2/1061* (2013.01); *H01M 2/30* (2013.01); *E04H 15/02* (2013.01); *H01M 2220/30* (2013.01)

(58) Field of Classification Search
CPC ........ H01M 2/06; H01M 2/08; H01M 2/1061; H01M 2/30; H01M 2220/30
See application file for complete search history.

(56) References Cited

FOREIGN PATENT DOCUMENTS

| | | |
|---|---|---|
| KR | 10-1101868 | 1/2012 |
| KR | 10-2012-0023491 | 3/2012 |

* cited by examiner

FABRIC-FRIENDLY TYPE SECONDARY BATTERY PACKAGE

This application claims the priority of Korean Patent Application No. 10-2014-0115707, filed on Sep. 1, 2014 in the KIPO (Korean Intellectual Property Office), the disclosure of which is incorporated herein entirely by reference. Further, this application is the National Stage application of International Application No. PCT/KR2015/007601, filed Jul. 22, 2015, which designates the United States and was published in Korean. Each of these applications is hereby incorporated by reference in their entirety into the present application.

TECHNICAL FIELD

The present invention relates to a secondary battery technique, and more particularly, to a fabric-friendly type second battery package.

BACKGROUND ART

Due to recent developments in electronics and communication technologies, researches on wearable devices are expanding. It is expected that cloth, various life or cultural products including clothes, and accessary based on inter-object communication will be informatized. Such an informatization technology requires a technology related to an energy source for operating an electronic device mounted in such products. As a technique for securing the energy source, an energy harvesting technology for obtaining energy from vibration, photo-electricity, or heat is being spotlighted.

However, in order to actually implement a wearable device, it is still necessary to achieve technical improvements related to a secondary battery for storing energy generated by using the energy harvesting technique accompanied with development of such energy sources.

For example, for various electric and electronic devices or display devices applicable to fabric products, such as clothes and hats that are used for a long time in daily life by a user, techniques regarding a second battery for supplying power to those devices or storing power produced by the energy harvest devices are demanded. Furthermore, in order to easily utilize electric power stored in the secondary battery, it is necessary to secure user convenience for using the secondary battery together with wearable devices.

DISCLOSURE OF THE INVENTION

Technical Problem

The present invention provides a battery package that may be easily applied to a fabric product, such as a cloth or a hat, and easily supply power thereto or collect energy therefrom, for application to a wearable device.

Technical Solution

According to an aspect of the present invention, there is provided a battery package that is attached onto an external member including an electronic circuit and a power supply terminal electrically connected to the electronic circuit and supplies power to the electronic circuit or collect power and stores energy, the battery package including a battery unit including one or more secondary battery cells and leads connected to the secondary battery cells and expose; a flexible encapsulator for accommodating the battery unit therein; exposed electrodes that are exposed on a surface of the flexible encapsulator and are electrically connected to the electronic circuit by being electrically connected to the leads; and first Velcro units arranged on the surface of the flexible encapsulator, wherein, as the first Velcro units of the battery package are attached to second Velcro units arranged on the external member, the battery package is detachably fixed onto the external member and the exposed electrodes of the battery package are connected to power supply terminals of the external member, thereby completing a power supply circuit for the electronic circuit.

The flexible encapsulator may include a fabric-friendly surface layer, which is a fibrous layer, a suede layer, a natural leather layer, an artificial leather layer, or a stacked structure thereof. According to some embodiments, the fibrous layer may include a fabric layer, a nonwoven layer, a knitted fabric layer, a velvet layer, or a microfiber layer, which includes natural fibers or synthetic fibers.

The flexible encapsulator may further include a base layer that is arranged between the fabric-friendly surface layer and the battery unit and is attached to the bottom surface of the fabric-friendly surface layer. The base layer may exhibit water-resistance or moisture-resistance or improve mechanical durability of the fabric-friendly type surface layer. Alternatively, the base layer may include a thermal fusing layer. According to an embodiment, the thermal fusing layer may include any one of a polypropylene-based polymer resin, a polyethylene-based polymer resin, and a copolymer thereof, or a mixture thereof. The flexible encapsulator may be sealed by bringing edges of the thermal fusing layers of the base layers facing each other across the battery unit into contact with each other and thermally fusing the edges of the thermal fusing layers.

The base layer may include a fabric layer, a nonwoven layer, a knitted fabric layer, a velvet layer, or a microfiber layer including fibrous materials, such as metal fibers, natural fibers, artificial fibers, natural leather, or artificial leather. The Velcro units may include a plurality of Velcros, and a Velcro pattern on the flexible encapsulator, which includes at least one of the shapes, the numbers, the sizes, and the arrangements of the plurality of Velcros, may be asymmetrical.

The external member may be a cloth, a hat, a bag, a tent, or a shoe. Furthermore, the electronic circuit may include any one of a power-consuming device and an energy harvesting device or a combination thereof. The battery package may be implemented as a wappen or an emblem.

According to another aspect of the present invention, there is provided a battery package that is attached onto an external member including an electronic circuit and a power supply terminal electrically connected to the electronic circuit and supplies power to the electronic circuit or collect power and stores energy, the battery package including a battery unit including one or more secondary battery cells and leads connected to the secondary battery cells and expose; a flexible encapsulator for accommodating the battery unit therein; and first conductive Velcro units that are exposed on a surface of the flexible encapsulator and are electrically connected to the electronic circuit by being electrically connected to the leads, wherein, as the first conductive Velcro units of the battery package are attached to second conductive Velcro units arranged on the external member, the battery package is detachably fixed onto the external member and the first conductive Velcro units of the battery package are connected to the second conductive Velcro units of the external member, thereby completing a power supply circuit for the electronic circuit.

The first conductive Velcro units or the second conductive Velcro units may include conductive polymer fibers, metal fibers, polymer fibers coated with a metallization layer, polymer fibers having dispersed therein conductive particles, carbon fibers, or mixtures thereof. The conductive polymer fibers may include polythiophene, polyaniline, polypyrrole, polyoxyphenylene, polyphenylene sulfide, polyfuran, polymethylpyrrole, polystyrene, derivatives thereof, or copolymers thereof.

The metal fibers may include stainless steel, platinum (Pt), gold (Au), silver (Ag), aluminum (Al), copper (Cu), iron (Fe), chromium (Cr) Mn), nickel (Ni), or an alloy thereof. The flexible encapsulator may include a fabric-friendly surface layer, which is a fibrous layer, a suede layer, a natural leather layer, an artificial leather layer, or a stacked structure thereof.

The fibrous layer may include a fabric layer, a nonwoven layer, a knitted fabric layer, a velvet layer, or a microfiber layer, which includes natural fibers or synthetic fibers. The flexible encapsulator may further include a base layer that is arranged between the fabric-friendly surface layer and the battery unit and is attached to the bottom surface of the fabric-friendly surface layer.

The base layer may exhibit water-resistance or moisture-resistance or improve mechanical durability of the fabric-friendly type surface layer. According to an embodiment, the base layer may include a thermal fusing layer. The conductive Velcro units may include a plurality of conductive Velcros, and a Velcro pattern on the flexible encapsulator, which includes at least one of the shapes, the numbers, the sizes, and the arrangements of the plurality of conductive Velcro, may be asymmetrical.

The external member may be a cloth, a hat, a bag, a tent, or a shoe. The electronic circuit may include any one of a power-consuming device and an energy harvesting device or a combination thereof. Furthermore, the battery package may be implemented as a wappen or an emblem.

According to the embodiment of the present invention, there may be provided a battery package including a flexible encapsulator having accommodated therein a battery unit, the battery package that may be detachably attached to an external member, which is a fabric product, by using Velcros for easily supplying power or easily harvesting energy. Furthermore, since the battery package provides a fabric-friendly type surface, the battery package may be provided in the form of a wappen or an emblem. Therefore, the battery package may not only function as a power supply circuit, but also provide decorative effects.

MODE FOR CARRYING OUT THE INVENTION

Figure 1A:
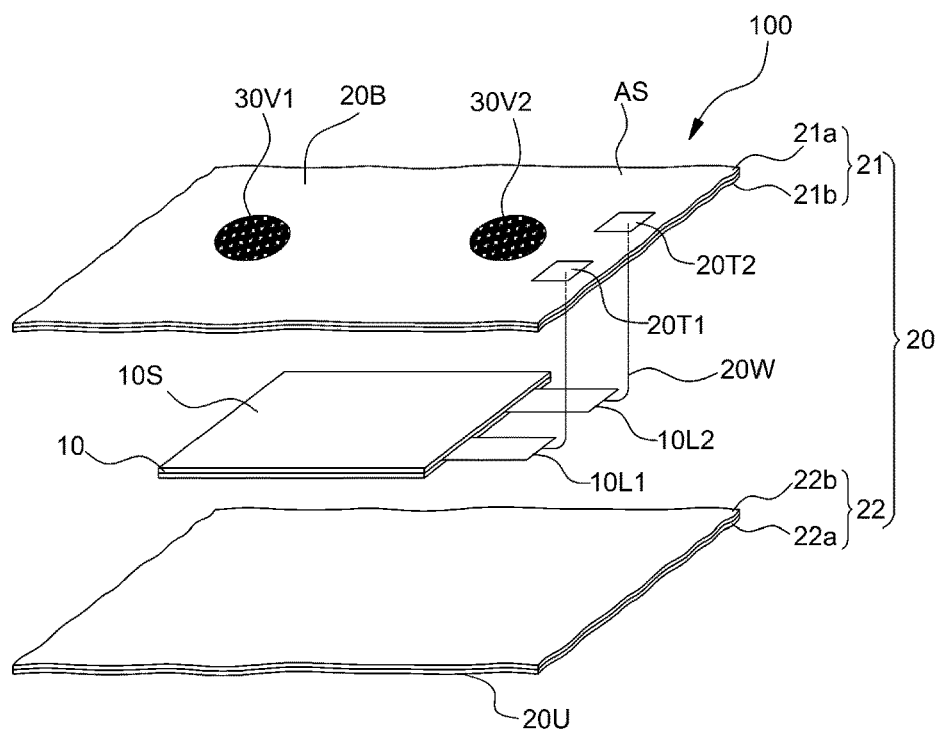
FIG. 1A is an exploded perspective view of a battery unit and a flexible encapsulator of a battery package according to an embodiment of the present invention.

Hereinafter, exemplary embodiments will be described in detail with reference to accompanying drawings.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Also, in the drawings, thickness and size of each layer are exaggerated for convenience and clarity of explanation, and like reference numerals denote like elements in the drawings. As used herein, the term "and/or" includes any and all combinations of any of listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1B:
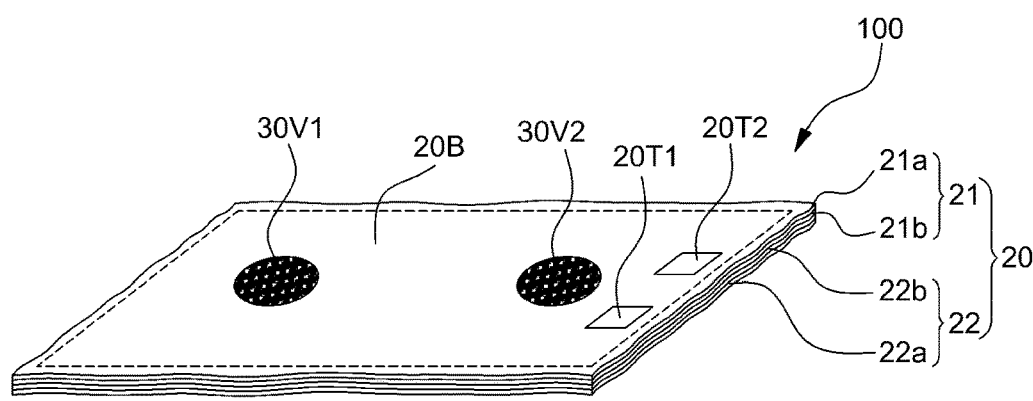
FIGS. 1B and 1C are perspective views of a bottom surface and a front surface of the battery package, respectively.
Figure 1C:
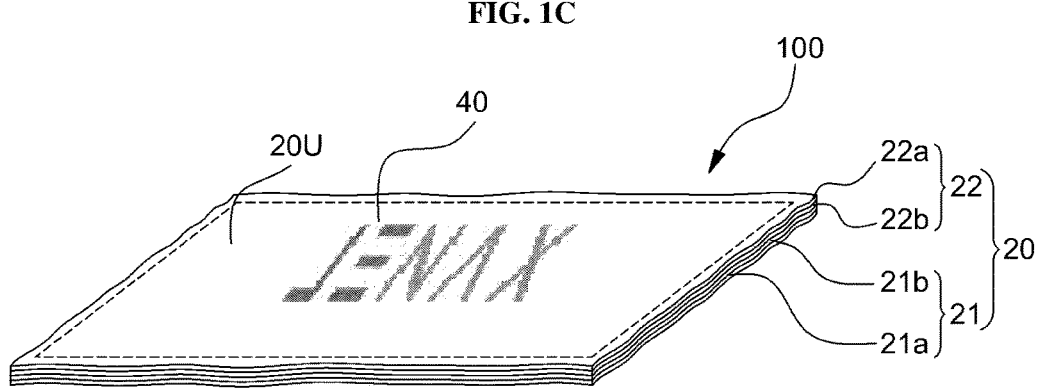

FIG. 1A is an exploded perspective view of a battery unit 10 and a flexible encapsulator 20 of a battery package 100 according to an embodiment of the present invention, and FIGS. 1B and 1C are perspective views of a bottom surface 100B and a front surface 100U of the battery package 100, respectively.

Referring to FIG. 1A, the battery package 100 includes the battery unit 10 and the flexible encapsulator 20 for accommodating the battery unit 10 therein. The battery unit 10 includes a single cell or a plurality of cells including two or more cells connected in series or in parallel to each other. As well-known in the art, each of these cells is a composite layer structure including a positive electrode, a negative electrode, and a separator between the electrodes, and the composite layer structure may be stacked, bent, or wound in order to increase the power capacity. The composite layer structure may include leads 10L1 and 10L2 that are electrically connected respectively to the positive electrode and the negative electrodes inside the battery unit 10 and are exposed to the outside for connection to an external circuit. For convenience of explanation, a first lead 10L1 of the leads 10L1 and 10L2 will be referred to as a positive electrode and the second lead 10L2 will be referred to as a negative electrode. Inside the flexible encapsulator 20, a charge/discharge protection circuit (not shown) for protecting the battery unit 10 may be further provided.

A shell 10S of the battery unit 10 may include a single protective layer or stacked protective layers as a layer(s) resistant to the outside moisture and electrolyte inside the battery unit 10. As unlimited examples, the protective layer may include polyethylene terephthalate (PET), nylon, polyester resin, or polyamide resin. Optionally, a metal layer may be further formed outside the protective layer. The metal layer may include aluminum (Al), copper (Cu), iron (Fe), carbon (C), chromium (Cr), manganese (Mn), nickel (Ni), or an alloy thereof. For example, the metal layer 21 may include Fe to enhance the mechanical strength and may include Al to improve flexibility as the main composition. According to another embodiment, the function of the shell 10S may be replaced by a flexible encapsulator 20 when the flexible encapsulator 20 includes the protective layer and the metal layer.

The flexible encapsulator 20 is a packaging material that stably accommodates the battery unit 10, and the outer surface of the flexible encapsulator 20 may include fabric-friendly type surface layers 21a and 22a in consideration of a surface of an external member, e.g., a cloth, a bag, or a hat on which the battery package 100 is to be installed. For example, each of the fabric-friendly type surface layers 21a and 22a may be formed of a fibrous layer, suede, natural leather, or artificial leather. The fibrous layer may include a fabric layer, a nonwoven layer, a knitted fabric layer, a velvet layer, or a microfiber layer, which includes natural fibers and/or synthetic fibers. According to another embodiment, from between the fabric-friendly type surface layers 21a and 22a, the fabric-friendly type surface layer 21a of a bottom surface 20B of the flexible encapsulator 20 is not limited to a fibrous structure and may be a polymeric resin-based substrate.

Each of the fabric-friendly type surface layers 21a and 22a may include a single layer or a composite stacked structure of the above-described materials. According to some embodiments, the flexible encapsulator 20 may further include base layers 21b and 22b attached to the bottom surfaces of the fabric-friendly type surface layers 21a and 22a, respectively. The base layers 21b and 22b may either improve water-resistance or moisture-resistance of the flexible encapsulator 20 of the fabric-friendly type surface layers 21a and 22a or reinforce mechanically the fabric-friendly type surface layers 21a and 22a for improving mechanical durability against wrinkles, exfoliation, and elastic recovery. When necessary, the base layers 21b and 22b may be adhered to the fabric-friendly type surface layers 21a and 22a via thermal fusion or by interposing an adhesive layer there between.

Each of the base layers 21b and 22b may include any one of a polypropylene-based polymer resin, a polyethylene-based polymer resin, and a copolymer thereof, or a mixture thereof. For example, the polypropylene-based polymer resin may include a polypropylene polymer, a propylene/ethylene random copolymer, a propylene/ethylene block copolymer, or an ethylene/propylene/α-olefin terpolymer. The polyethylene-based polymer resin may include, but is not limited to, ethylene vinyl acetate copolymer (EVA), ethylene acrylic acid copolymer (EAA), methacrylic acid-ethylene copolymer (EMAA), ethyl acrylate-ethylene copolymer (EEA), a methyl acrylate-ethylene copolymer (EMA), or a methyl methacrylate-ethylene copolymer (EMMA). According to some embodiments, the materials described above are able to be partial melted at low temperatures, the base layers 21b and 22b and a surface 10S of the battery unit 10 may be fused to each other by applying heat thereto. According to another embodiment, the base layers 21b and 22b may include a fabric layer, a nonwoven layer, a knitted fabric layer, a velvet layer, or a microfiber layer including fibrous materials, such as metal fibers, natural fibers, artificial fibers, natural leather, or artificial leather. However, the present invention is not limited thereto.

According to some embodiments, the flexible encapsulator 20 may be divided into two pieces 21 and 22 facing each other. In this case, after the pieces 21 and 22 are brought into contact with each other, the pieces 21 and 22 may be attached to each other by stitching edges thereof as shown in FIG. 1B, and thus the flexible encapsulator 20 may be sealed while the battery unit 10 is accommodated therein.

According to another embodiment, as described above, when the base layers 22a and 22b are provided below the fabric-friendly type surface layers 21a and 22a, the flexible encapsulator 20 may be sealed by thermally fusing the base layers 22a and 22b, which are in contact with each other. FIG. 1A shows an embodiment in which two fabric-friendly type surface layers 21a and 22a are coupled to each other, and the two fabric-friendly type surface layers 21a and 22a may be formed of different materials. The fabric-friendly type surface layer 22a of a front surface 20U of the flexible encapsulator 20, which is a surface exposed to the outside, may include a material selected in consideration of the texture and cosmetization of an external member, whereas the bottom surface 20B of the flexible encapsulator 20, which is a surface to be attached to the external member, may include a suitable fabric-friendly type surface layer for supporting exposed electrodes 20T1 and 20T2 and first Velcro units 30V1 and 30V2 as described below. For example, the fabric-friendly type surface layer 22a of the front surface 20U of the flexible encapsulator 20 may include leather, whereas the fabric-friendly type surface layer 21a of the bottom surface 20B of the flexible encapsulator 20 may include a polymeric resin.

Since the fabric-friendly type materials generally have flexible properties, the fabric-friendly type materials may be deformed together with an external member in correspondence to deformation of the external member and may be harmonized with the external member without an incongruity. Optionally, information, such as a drawing or letters, may be arranged on a surface of the flexible encapsulator 20 and show a decorative effect when the flexible encapsulator 20 is attached to an external member. Detailed description thereof will be given below.

Inside the flexible encapsulator 20, the first lead 10L1 is electrically connected to the first exposed electrode 20T1 and the second lead 10L2 is electrically connected to the second exposed electrode 20T2. The electrical connections between the leads 10L1 and 10L2 and the exposed electrodes 20T1 and 20T2 may be established via a conductive paste and a solder. According to another embodiment, the leads 10L1 and 10L2 may be directly exposed to the outside of the flexible encapsulator 20, and thus exposed ends of the leads 10L1 and 10L2 may function as the exposed electrodes 20T1 and 20T2. According to another embodiment, a conductor for redistribution wiring may be interposed between leads 10L1 and 10L2 and the exposed electrodes 20T1 and 20T2.

Referring to FIG. 1B, the exposed electrodes 20T1 and 20T2 and the first Velcro units 30V1 and 30V2 exposed out of the bottom surface 20B of the flexible encapsulator 20 are disposed on the bottom surface 20B of the flexible encapsulator 20. The numbers and/or the locations of the exposed electrodes 20T1 and 20T2 and the first Velcro units 30V1 and 30V2 may vary. FIG. 1B merely shows an example in which the exposed electrodes 20T1 and 20T2 are disposed at the edges of the bottom surface 20B of the flexible encapsulator 20 and the first and second velocities 30V1 and 30V2 are equally disposed on the bottom surface 20B of the flexible encapsulator 20 apart from each other.

According to another embodiment, the Velcro units 30V1 and 30V2 allow a user to recognize a direction in which the battery package 100 is attached, thereby guiding the user to combine exposed electrodes 20T1 and 20T2, e.g., the positive electrode 20T1 and the negative electrode 20T2, with a positive electrode 1000T1 and a negative electrode 1000T2 of exposed electrodes 1000T1 and 1000T2 on an external member 1000, to which the battery package 100 is to be attached with securing exact electrical polarities.

According to another embodiment, the first Velcro units 30V1 and 30V2 may be arranged to surround the exposed electrodes 20T1 and 20T2. According to another embodiment, the first Velcro units 30V1 and 30V2 are disposed on the bottom surface 20B of the flexible encapsulator 20, but the exposed electrodes 20T1 and 20T2 may be disposed on the front surface 20U of the flexible encapsulator 20.

The first Velcro units 30V1 and 30V2 are paired and combined with the second Velcro units 1000V1 and 1000V2 on the external member 1000 to which the battery package 100 is to be attached, as described below with reference to FIG. 4. For example, when the first Velcro units 30V1 and 30V2 have rough surfaces, the second Velcro units 1000V1 and 1000V2 may have smooth surfaces, or vice versa. Furthermore, the first Velcro units 30V1 and 30V2 may include a plurality of (two or more) Velcros as shown in FIG. 1B. In this case, the Velcro 30V1 may have a rough surface, whereas the other Velcro 30V2 may have a smooth surface. To correspond this configuration, the second Velcro units 1000V1 and 1000V2 on the external member 1000 also include a plurality of Velcros, and the second Velcros 1000V1 and 1000V2 may have a smooth surface and a rough surface, respectively. Therefore, when the surface properties of Velcros constituting the first Velcro units 30V1 and 30V2 are differentiated from each other, the first Velcro units 30V1 and 30V2 may allow a user to recognize a direction in which the battery package 100 is attached, thereby guiding the user to combine the first Velcro units 30V1 and 30V2 with the positive electrode 1000T1 and the negative electrode 1000T2 of the exposed electrodes 1000T1 and 1000T2 on the external member 1000, to which the battery package 100 is to be attached so as to match electrical polarities there between. In this case, even when the user tries to attach the battery package 100 onto the external member 1000 without matching electrical polarities of the electrodes 20T1 and 20T2 of the battery package 100 to those of the electrodes 1000T1 and 1000T2 of the external member 1000, the Velcros will not stick to each other.

The shape, the number, the size, and/or the arrangement of the first Velcro units 30V1 and 30V2 described above are not limited to the two circular shapes as shown in FIG. 1B. For example, the Velcros of the first Velcro units 30V1 and 30V2 may have a rectangular shape, a triangular shape, a circular shape, an elliptical shape, a linear shape, a wavy shape, any of other polygonal shapes, or a curved shape and may be formed on the entire bottom surface 100B of the battery package 100. Various modifications of the Velcros may be made within the scope of the present invention, and, in order to prevent the battery package 100 and the external member 1000 from being attached to each other without matching the polarities of the electrodes due to a user's inadvertent attempt for attachment of the battery package 100, the Velcros may be changed to be another configuration. For example, such an effect may be obtained from asymmetrical shapes or an asymmetrical arrangement of the first Velcro units 30V1 and 30V2 on the bottom surface 20B of the battery package 100. Detailed description of the asymmetrical arrangement thereof will be given below.

Referring to FIG. 1C, information 40, such as a drawing, a logo, a character, or a letter, may be arranged on the front side of the flexible encapsulator 20 by dying, coating, or stitching the same in a conventional fiber-based process. However, the present invention is not limited thereto. The battery package 100 may be mold to have a wappen-like shape or an emblem-like shape overall, and thus the battery package 100 may provide a decorative effect when the battery package 100 is attached to an external member.

Figure 2A:
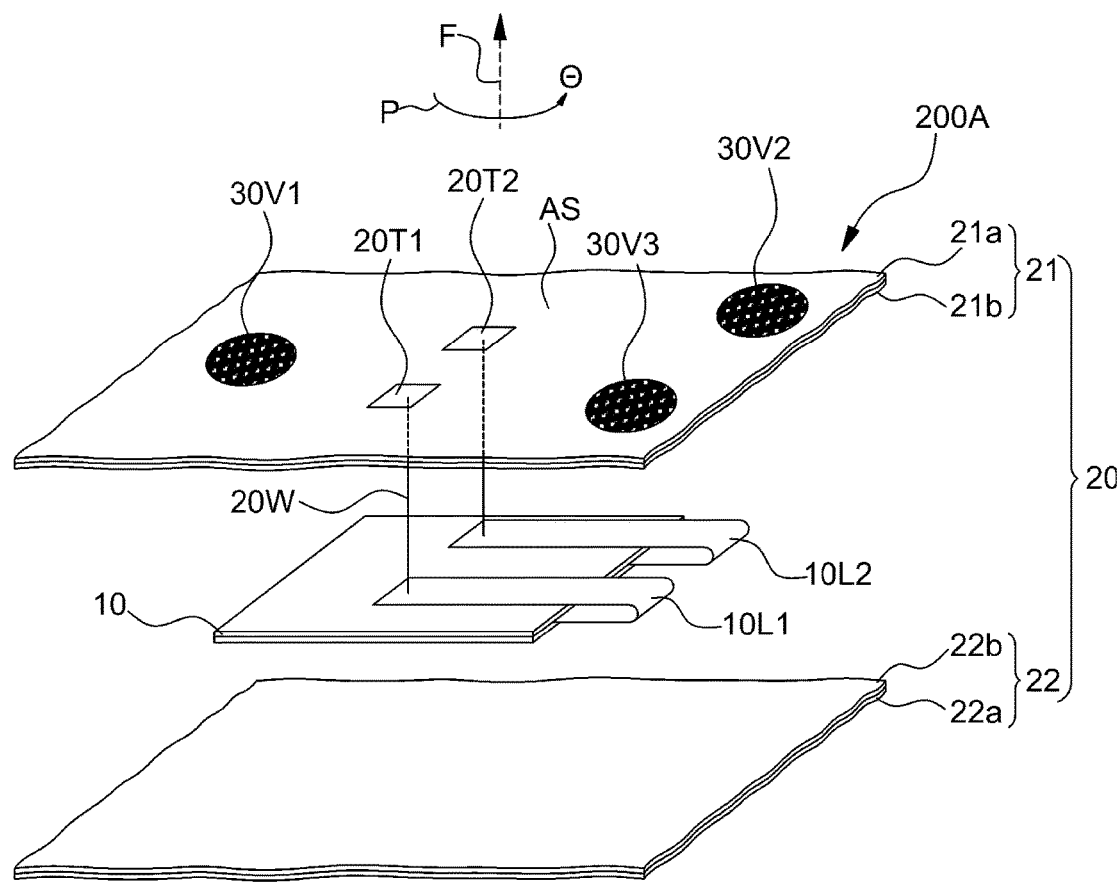
FIGS. 2A and 2B are exploded perspective views of battery packages according to other embodiments of the present invention.
Figure 2B:
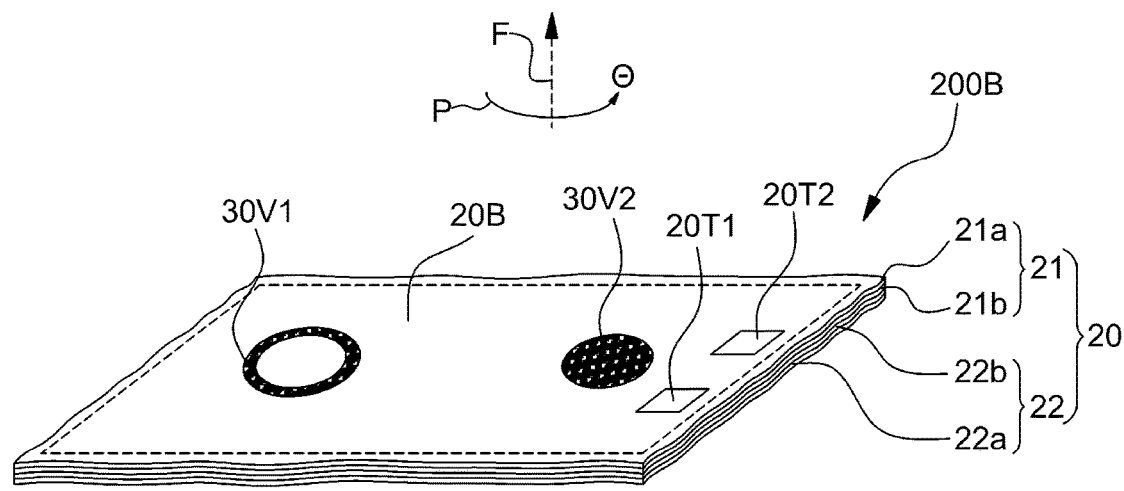

FIGS. 2A and 2B are exploded perspective views of battery packages 100 according to other embodiments of the present invention.

Referring to FIG. 2A, the exposed electrodes 20T1 and 20T2 are disposed at the center of the flexible encapsulator 20. To this end, the leads 10L1 and 10L2 of the battery unit 10 may be bended and extend to the exposed electrodes 20T1 and 20T2 for connection with the exposed electrodes 20T1 and 20T2 inside the flexible encapsulator 20. According to another embodiment, a plurality of (two or more) sets of the exposed electrodes 20T1 and 20T2 may be disposed and connected to a charge-discharge protection circuit or other circuits. Furthermore, although not shown, a charging/discharging protection circuit for the battery unit 10 may be further provided inside the flexible encapsulator 20.

As described above with reference to FIG. 1A through 1C, a Velcro pattern including the shapes, the numbers, the sizes, and/or the arrangements of first Velcro units 30V0, 30V1, 30V2, and 30V3 may be designed to prevent the battery package 100 and the external member 1000 from being attached to each other without matching the polarities of electrodes. FIG. 2A exemplifies the three first Velcro units 31V1, 31V2, and 31V3. The arrangement of the three Velcros helps the electrodes 20T1 and 20T2 to be attached onto the external member 1000 with polarities matched. For example, when a user rotates the battery package 100 180° in a direction perpendicular to a surface of the battery package 100 (that is, in the direction indicated by the arrow F) and attaches the battery package 100 in a direction different from a direction in which the battery package 100 is supposed to be attached, the first Velcro units 30V1, 30V2, and 30V3 of the battery package 100 do not face the second Velcro units on the external member 1000, and thus the battery package 100 is not attached to the external member 1000.

FIG. 2B shows another embodiment in which the first Velcro units 30V1 and 30V2 provided on the bottom surface 20B of the battery package 100 are attached to the electrodes 1000T1 and 1000T2 on the external member 1000 with the polarities of the electrodes of the electrodes 20T1 and 20T2 matched to those of the electrodes 1000T1 and 1000T2. As one of the first Velcro units 30V1 and 30V2 has a doughnut-like shape (30V1) and the other one of the first Velcro units 30V1 and 30V2 has a plate-like shape (30V2), when it is attempted to attach the battery package 100 in a direction other than a designated direction, the first Velcro units 30V1 and 30V2 do not face the second Velcro units 1000V1 and the 1000V2, respectively. Therefore, the battery package 100 is not attached to the external member 1000.

In the above-described embodiments, when the battery package 100 is rotated in a direction (indicated by arrow F) vertical to the bottom surface 20B of the battery package 100, a Velcro pattern regarding the shape, the number, the size, or the arrangement of the Velcros provided on the bottom surface 20B appears only once and no two or more same Velcro patterns appear while Θ varies within a range of 360°. Therefore, when the user inadvertently attempts to attach the battery package 100 onto an external member in a wrong direction, first Velcro units of the battery package 100 and second Velcro units on the external member do not face each other, and thus the first and second Velcro units are not attached to each other. As such, a configuration that a Velcro pattern becomes asymmetric upon rotation of the battery package may be achieved based on the shapes, the numbers, and the arrangements of the Velcro or combinations thereof within the scope of the present invention.

Figure 3:
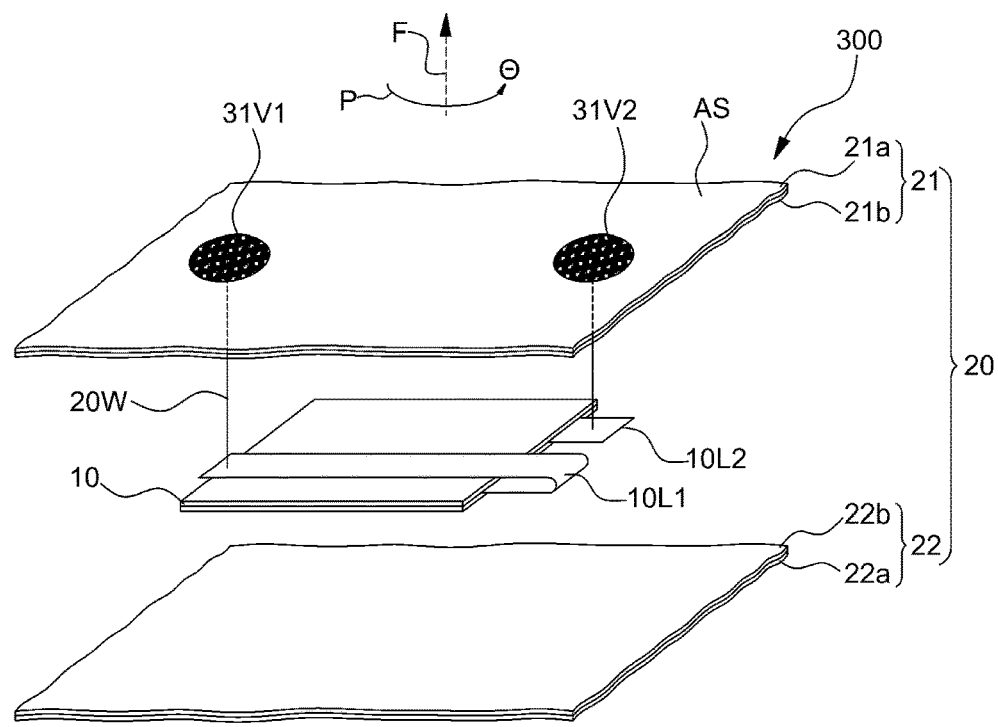
FIG. 3 is an exploded perspective view of a battery package according to another embodiment of the present invention.

FIG. 3 is an exploded perspective view of a battery package 200 according to another embodiment of the present invention.

Referring to FIG. 3, the battery package 200 includes conductive Velcro units 31V1 and 31V2 disposed outside the flexible encapsulator 20. The conductive Velcro units 31V1 and 31V2 are electrically connected to the leads 10L1 and 10L2 of the battery unit 10 accommodated in the flexible encapsulator 20. The electrical connections between the leads 10L1 and 10L2 and the conductive Velcro units 31V1 and 31V2 may be established via a direct connection or via a conductive wire 200W for redistribution wiring, but the present invention is not limited thereto.

In this case, the conductive Velcro units 31V1 and 31V2 may function as electrodes for electrical connection with an external circuit. Velcro units of an external member to be attached to the conductive Velcro units 31V1 and 31V2 of the battery package 200, e.g., the second Velcro units 1000V1 and 1000V2 of FIG. 4, may also include conductive Velcros. In this case, unlike the battery package 100 shown in FIG. 1A, the exposed electrodes 20T1, 20T2, 1000T1, and 1000T2 may be omitted.

The conductive Velcro units 31V1 and 31V2 may secure conductivity by including conductive polymer fibers, metal fibers, polymer fibers coated with a metallization layer, polymer fibers having dispersed therein conductive particles, carbon fibers, or mixtures thereof. The conductive polymer fibers may include, but are not limited to, polythiophene, polyaniline, polypyrrole, polyoxyphenylene, polyphenylene sulfide, polyfuran, polymethylpyrrole, polystyrene, derivatives thereof, or copolymers thereof. Examples of the metal fibers include, but are not limited to, stainless steel, platinum (Pt), gold (Au), silver (Ag), aluminum (Al), copper (Cu), iron (Fe), chromium (Cr) Mn), nickel (Ni), or an alloy thereof.

According to another embodiment, as described above, the conductive Velcro units 31V1 and 31V2 may be designed, such that, when the battery package 200 is rotated in a direction (indicated by arrow F) vertical to the bottom surface 20B of the battery package 200, a Velcro pattern regarding the shape, the number, the size, or the arrangement of the Velcros 31V1 and 31V2 provided on the bottom surface 20B appears only once and no two or more same Velcro patterns appear while Θ varies within a range of 360°. Therefore, when a user inadvertently attempts to attach the battery package 200 onto an external member in a wrong direction, first Velcro units of the battery package 200 and second Velcro units on the external member do not face each other, and thus the first and second Velcro units are not attached to each other.

Figure 4:
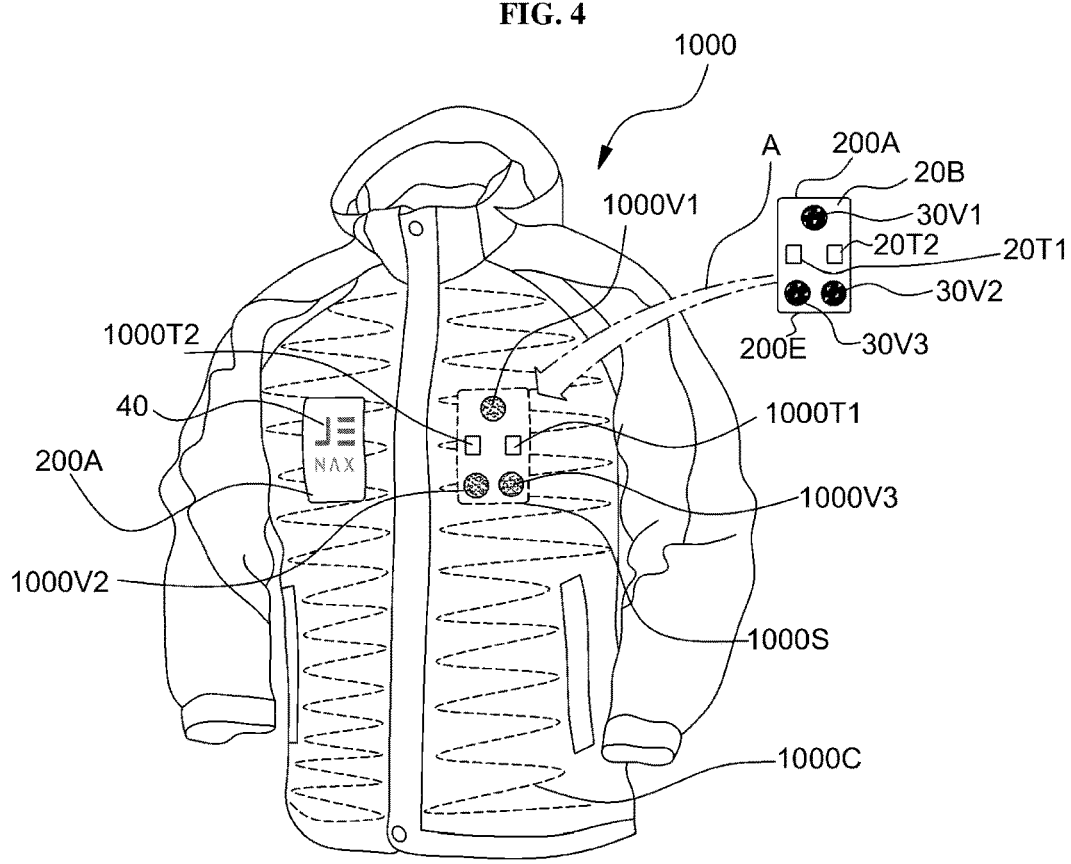
FIG. 4 is diagram showing a cloth which functions as an external member to which a battery package according to an embodiment of the present invention is to be attached.

FIG. 4 is diagram showing a cloth 1000 providing an external member to which a battery package according to an embodiment of the present invention is to be attached.

Referring to FIG. 4, the cloth 1000 includes an electronic circuit for sensing the external temperature and driving a coil 1000 that generates heat when power is applied thereto for providing warmth when the external temperature is low. Power supplied to the coil 1000 is output from a battery package 200A. The battery package 200A shown in FIG. 4 is the battery package described above with reference to FIG. 2A.

The first conductive Velcro units 30V1, 30V2, and 30V3 of the battery package 100 have smooth surfaces, the second conductive Velcro units 1000V1, 1000V2, and 1000V3 provided on the cloth 1000 have rough surfaces, where the battery package 200A is attached onto the cloth 1000, which is an external member, as the first conductive Velcro units 31V1, 31V2, and 31V3 are attached to the second conductive Velcro units 1000V1, 1000V2, and 1000V3, respectively. Furthermore, the exposed electrodes 20T1 and 20T2 of the battery package 200A, e.g., the positive electrode 20T1 and the negative electrode 20T2, contact and are electrically connected to power supply terminals on the cloth 1000, e.g., the positive electrode 1000T1 and the negative electrode 1000T2, respectively, thereby completing a power supply circuit for supplying power.

As described above with reference to FIG. 2A, the shape, the size, and/or the arrangement of the first Velcro units 30V1, 30V2, and 30V3 may be designed to prevent the battery package 200A from being attached to the external member 1000 without matching polarities of electrodes due to a user's inadvertent attempt for attaching the battery package 200A to the external member 1000. The three conductive Velcro units 30V1, 30V2, and 30V3 are arranged, such that the positive electrode 20T1 and the negative electrode 20T2 of the battery package 200A are aligned and attached to the power supply terminals, that is, the positive electrode 1000T1 and the negative electrode 1000T2 on the external member 1000.

When a user attempts to attach the battery package 200A to a battery package location 1000S of the cloth 1000 while the lower portion 200E of the battery package 200A is located up (that is, while the lower portion 200E of the battery package 200A faces toward the head of the user), the first Velcro units 30V1, 30V2, and 30V3 of the battery package 200A and the second Velcro units 1000V1, 1000V2, and 1000V3 on the external member 1000 do not face each other, and thus the battery package 200A is not attached to the external member 1000. Therefore, according to embodiments of the present invention, polarity misalignment due to a user's inadvertent attempt for attaching a battery package to an external member may be prevented.

The flexible encapsulator 20 of the battery package 200A includes the fabric-friendly type surface layer 22a and, by displaying the information 40, such as a letter or a drawing, on the front surface of the flexible encapsulator 20, the battery package 200A may provide not only functions as a battery package, but also a decorative effect that may enhance the aesthetics of a cloth itself. Furthermore, the user may easily remove the spent battery package 200A from the cloth 1000, charge the same by using a suitable charger, and operate the coil 100 again by attaching the same to the cloth 1000 again. The charger may also include conductive Velcro units that are attached to and paired with the conductive Velcro units of the battery package 200A, wherein, as the conductive Velcros are attached to each other, the battery unit of the battery package 200A may be charged.

The cloth 1000 consumes electricity and a discharging process in which the battery package unit 200A supplies electric power is described above. However, electronic circuits of the present invention are not limited to power-consuming devices. For example, when battery cells in the battery package 200A are secondary battery cells, an electronic circuit provided in the cloth 1000 may be an energy harvesting device, such as a piezoelectric device, and the power generated thereby may be stored in the battery package 200A and the stored electricity may be reused. Furthermore, according to another embodiment, the electronic circuit may be a combination of a power-consuming device and an energy harvesting device, where a battery package may be used for collecting and reusing energy.

In the embodiments described above, the cloth as the external member is merely an example, and other power-consuming fabric members, such as hats, bags, tents, shoes, or other power-generating fabric members, such as hats, bags, and shoes, are also included in the embodiments of the present invention.

While the present invention has been described in connection with what is presently considered to be practical exemplary embodiments, it is to be understood that the invention is not limited to the disclosed embodiments, but, on the contrary, will be apparent to those of ordinary skill in the art.

INDUSTRIAL APPLICABILITY

According to the embodiment of the present invention, there may be provided a battery package including a flexible encapsulator having accommodated therein a battery unit, the battery package that may be detachably attached to an external member, which is a fabric product, by using Velcros for easily supplying power or easily harvesting energy.

The invention claimed is:

1. A battery package that is attached onto an external member comprising an electronic circuit and power supply terminals electrically connected to the electronic circuit and that supply power to the electronic circuit or collect power to store energy, the battery package comprising:
   a battery unit comprising one or more secondary battery cells and leads connected to the secondary battery cells and exposed;
   a flexible encapsulator for accommodating the battery unit therein;
   exposed electrodes that are exposed onto a surface of the flexible encapsulator and are electrically connected to the electronic circuit by being electrically connected to the leads; and
   first hook-and-loop fastener units arranged on the surface of the flexible encapsulator,
   wherein, as the first hook-and-loop fastener units of the battery package are attached to second hook-and-loop fastener units arranged on the external member, the battery package is detachably fixed onto the external member and the exposed electrodes of the battery package are connected to the power supply terminals of the external member, thereby completing a power supply circuit for the electronic circuit,
   wherein the first and second hook-and-loop fastener comprise a plurality of hook-and-loop fasteners having a hook-and-loop fastener pattern, respectively, and
   wherein the hook-and-loop fastener pattern comprises at least one of shapes, numbers, sizes, and arrangements of the plurality of hook-and-loop fasteners, and the hook-and-loop fastener pattern is asymmetrical in order to prevent the battery package and the external member from being attached to each other without matching polarities between the exposed electrodes and the power supply terminals due to a user's inadvertent attempt for attachment of the battery package.

2. The battery package of claim 1, wherein the flexible encapsulator comprises a fabric-friendly surface layer, which is a fibrous layer, a suede layer, a natural leather layer, an artificial leather layer, or a stacked structure thereof.

3. The battery package of claim 2, wherein the fibrous layer comprises a fabric layer, a nonwoven layer, a knitted fabric layer, a velvet layer, or a microfiber layer, which comprises natural fibers or synthetic fibers.

4. The battery package of claim 2, wherein the flexible encapsulator further comprise a base layer that is arranged between the fabric-friendly surface layer and the battery unit and is attached to the bottom surface of the fabric-friendly surface layer.

5. The battery package of claim 4, wherein the base layer exhibits water-resistance or moisture-resistance or improves mechanical durability of the fabric-friendly type surface layer.

6. The battery package of claim 4, wherein the base layer comprises a thermal fusing layer.

7. The battery package of claim 6, wherein the thermal fusing layer comprises any one of a polypropylene-based polymer resin, a polyethylene-based polymer resin, and a copolymer thereof, or a mixture thereof.

8. The battery package of claim 6, wherein the flexible encapsulator is sealed by bringing edges of the thermal fusing layers of the base layers facing each other across the battery unit into contact with each other and thermally fusing the edges of the thermal fusing layers.

9. The battery package of claim 4, wherein the base layer comprises a fabric layer, a nonwoven layer, a knitted fabric layer, a velvet layer, or a microfiber layer including fibrous materials, such as metal fibers, natural fibers, artificial fibers, natural leather, or artificial leather.

10. The battery package of claim 1, wherein the external member is a cloth, a hat, a bag, a tent, or a shoe.

11. The battery package of claim 1, wherein the electronic circuit comprises any one of a power-consuming device and an energy harvesting device or a combination thereof.

12. The battery package of claim 1, wherein the battery package has a wappen or an emblem.

13. A battery package that is attached onto an external member comprising an electronic circuit and a power supply terminals electrically connected to the electronic circuit and that supply power to the electronic circuit or collect power to store energy, the battery package comprising:
   a battery unit comprising one or more secondary battery cells and leads connected to the secondary battery cells;
   a flexible encapsulator for accommodating the battery unit therein; and
   first conductive hook-and-loop fastener units that are exposed onto a surface of the flexible encapsulator and are electrically connected to the electronic circuit by being electrically connected to the leads,
   wherein, as the first conductive hook-and-loop fastener units of the battery package are attached to second conductive hook-and-loop fastener units arranged on the external member, the battery package is detachably fixed onto the external member and the first conductive hook-and-loop fastener units of the battery package are connected to the second conductive hook-and-loop fastener units of the external member, thereby completing a power supply circuit for the electronic circuit,
   wherein the first and second hook-and-loop fastener comprise a plurality of hook-and-loop fasteners having a hook-and-loop fastener pattern, respectively, and
   wherein the hook-and-loop fastener pattern comprises at least one of shapes, numbers, sizes, and arrangements of the plurality of hook-and-loop fasteners, and the hook-and-loop fastener pattern is asymmetrical in order to prevent the battery package and the external member from being attached to each other without matching polarities between the exposed electrodes and the power supply terminals due to a user's inadvertent attempt for attachment of the battery package.

14. The battery package of claim 13, wherein the first conductive hook-and-loop fastener units or the second conductive hook-and-loop fastener units comprises conductive polymer fibers, metal fibers, polymer fibers coated with a metallization layer, polymer fibers having dispersed therein conductive particles, carbon fibers, or mixtures thereof.

15. The battery package of claim 14, wherein the conductive polymer fibers comprise polythiophene, polyaniline, polypyrrole, polyoxyphenylene, polyphenylene sulfide, polyfuran, polymethylpyrrole, polystyrene, derivatives thereof, or copolymers thereof.

16. The battery package of claim 14, wherein the metal fibers comprise stainless steel, platinum (Pt), gold (Au), silver (Ag), aluminium (Al), copper (Cu), iron (Fe), chromium (Cr) Mn), nickel (Ni), or an alloy thereof.

17. The battery package of claim 13, wherein the flexible encapsulator comprises a fabric-friendly surface layer, which is a fibrous layer, a suede layer, a natural leather layer, an artificial leather layer, or a stacked structure thereof.

18. The battery package of claim 17, wherein the fibrous layer comprises a fabric layer, a nonwoven layer, a knitted fabric layer, a velvet layer, or a microfiber layer, which comprises natural fibers or synthetic fibers.

19. The battery package of claim 17, wherein the flexible encapsulator further comprise a base layer that is arranged between the fabric-friendly surface layer and the battery unit and is attached to the bottom surface of the fabric-friendly surface layer.

20. The battery package of claim 19, wherein the base layer exhibits water-resistance or moisture-resistance or improves mechanical durability of the fabric-friendly type surface layer.

21. The battery package of claim 19, wherein the base layer comprises a thermal fusing layer.

22. The battery package of claim 13, wherein the external member is a cloth, a hat, a bag, a tent, or a shoe.

23. The battery package of claim 13, wherein the electronic circuit comprises any one of a power-consuming device and an energy harvesting device or a combination thereof.

24. The battery package of claim 13, wherein the battery package has a wappen or an emblem.

* * * * *